J. A. WERNER.
CASH AND AUTOGRAPHIC REGISTER.
APPLICATION FILED FEB. 16, 1909.

1,131,758.

Patented Mar. 16, 1915.
5 SHEETS—SHEET 1.

Fig. 1.

J. A. WERNER.
CASH AND AUTOGRAPHIC REGISTER.
APPLICATION FILED FEB. 16, 1909.

1,131,758.

Patented Mar. 16, 1915.
5 SHEETS—SHEET 5.

Witnesses
H. F. Sadgebury
H. N. Lindsey Jr.

Inventor
John A. Werner
by R. C. Mass
Carl Beust
Attorneys

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND AUTOGRAPHIC REGISTER.

1,131,758.  Specification of Letters Patent.  Patented Mar. 16, 1915.

Application filed February 16, 1909. Serial No. 478,152.

*To all whom it may concern:*

Be it known that I, JOHN A. WERNER, a citizen of the United States, residing at Dayton, in the county of Montgomery and State of Ohio, have invented certain new and useful Improvements in Cash and Autographic Registers, of which I declare the following to be a full, clear, and exact description.

This invention relates to improvements in cash and autographic registers and more particularly to autographic registers and the means by which they are controlled by the cash register mechanism.

The machine to which the present improvements are applied is the one shown and described in United States Letters Patent 497,860, granted May 23, 1893, to Thomas Carney with improvements thereto shown and described in United States Letters Patent 666,648, granted January 29, 1901, to Joseph P. Cleal and United States Letters Patent 748,260, granted December 29, 1903, to Thomas Carney.

Among the objects of this invention is to provide a combined cash register and autographic register with improved means under the control of the cash register for controlling the autographic register upon certain special operations of the cash register.

Another object of the invention is to provide controlling means for the autographic register which will bring it into operation on every operation of the cash register or only on special operations of the cash register, or cause it to be entirely inoperative.

With these and incidental objects in view, the invention consists in certain novel features of construction and combinations of parts, the essential elements of which are set forth in appended claims and a preferred form of embodiment of which is hereinafter disclosed with reference to the drawings which accompany and form part of this specification.

Of said drawings.

The cash register comprises a plurality of amount keys which are grouped in denominational order; special keys, a totalizer, differential mechanism for actuating the totalizer and setting the indicators and printing mechanism. Each group of amount keys is arranged so that any key in the group may actuate a segment gear which is meshed with a pinion of the totalizer corresponding in denominational value to the group of keys which are connected to its respective segment. Each key of a group carries an upright slide and each of the uprights is provided with a slot, but the slots in the uprights of one group all differ in length. A rod which is carried by the totalizer actuating segment for such group extends across the path of the uprights just above these slots and the slots are so graded in depth that the keys will cause the segment to be rocked according to their value. For instance, the "Nine" key will rock the segment nine units of movement. By this mechanism the totalizer is differentially actuated as desired. In the machine represented in the drawings there are three such denominational groups of keys and a totalizer actuating segment for each group. Each key has an individual indicator tablet which is raised to view when the key is depressed. The machine is also provided with four special keys, namely, for "Received on Account", "Charge", "Paid Out", and "No Sale", the latter three of which, when depressed, cause the totalizer to be held out of mesh with the actuating segments so that the amount which is then set up by the amount keys will merely be indicated and printed.

The printing mechanism comprises a digit type wheel for each of the three denominational groups of keys and a special type wheel carrying type to designate the position in which said carrier rests when the machine is operated to enter cash transactions and other type to designate the four special keys just mentioned. The amount type wheels are set by the segments which actuate the totalizer while the special type wheel is set by a separate segment differentially driven by operations of the various special keys.

The autographic device comprises suitable supports for holding the roll of paper and a roll for receiving the paper from the first mentioned roll. It is also arranged to feed the paper strip over a writing support a certain distance upon each operation of the machine, but this feeding mechanism can be made, at will, operative or inoperative or to feed only on particular operations of the machine.

A description of the form of mechanism shown in Figs. 1 to 8 will be first given, and thereafter the modified form of Fig. 9 will be described.

Figure 1:
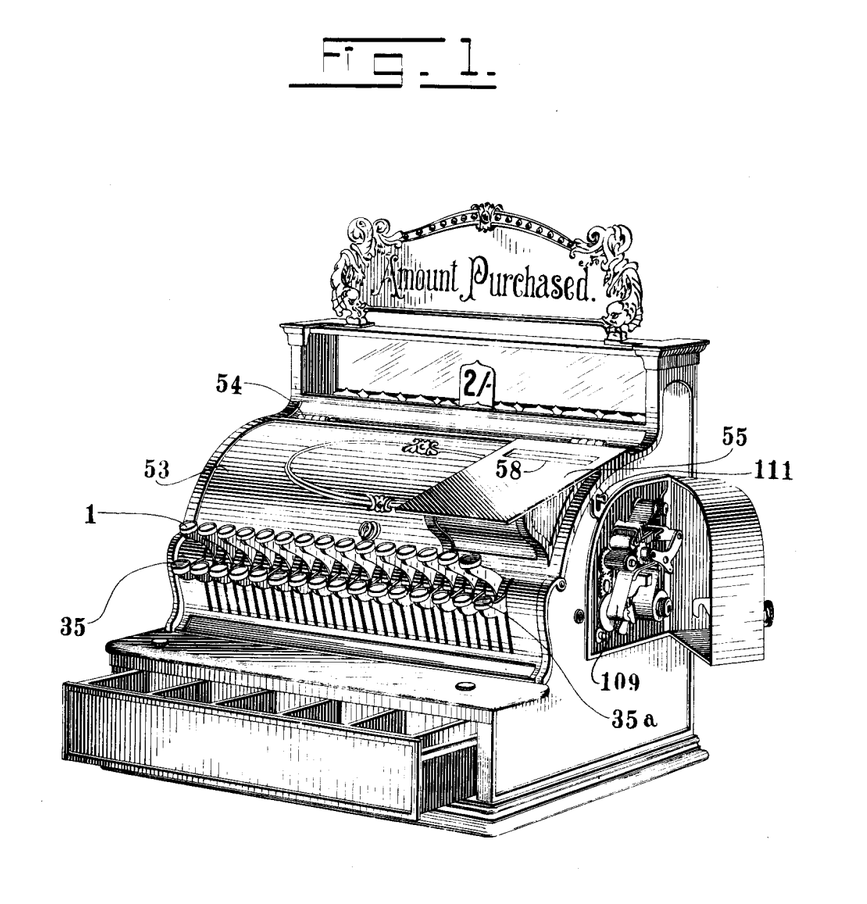
Figure 1 is a perspective view of the combined cash and autographic registers.
Figure 2:
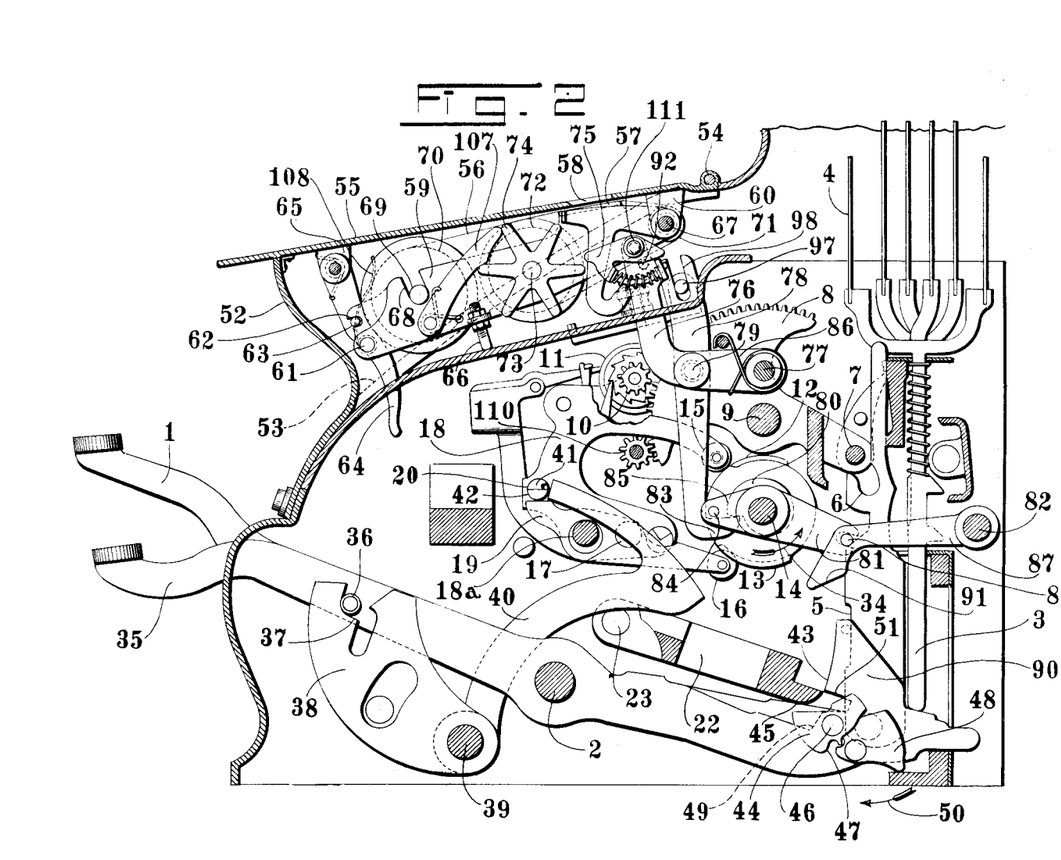
Fig. 2 is a transverse vertical section of the combined registers taken on a plane passing through the center of the autographic register.
Figures 3, 4, 5, 6, 7:
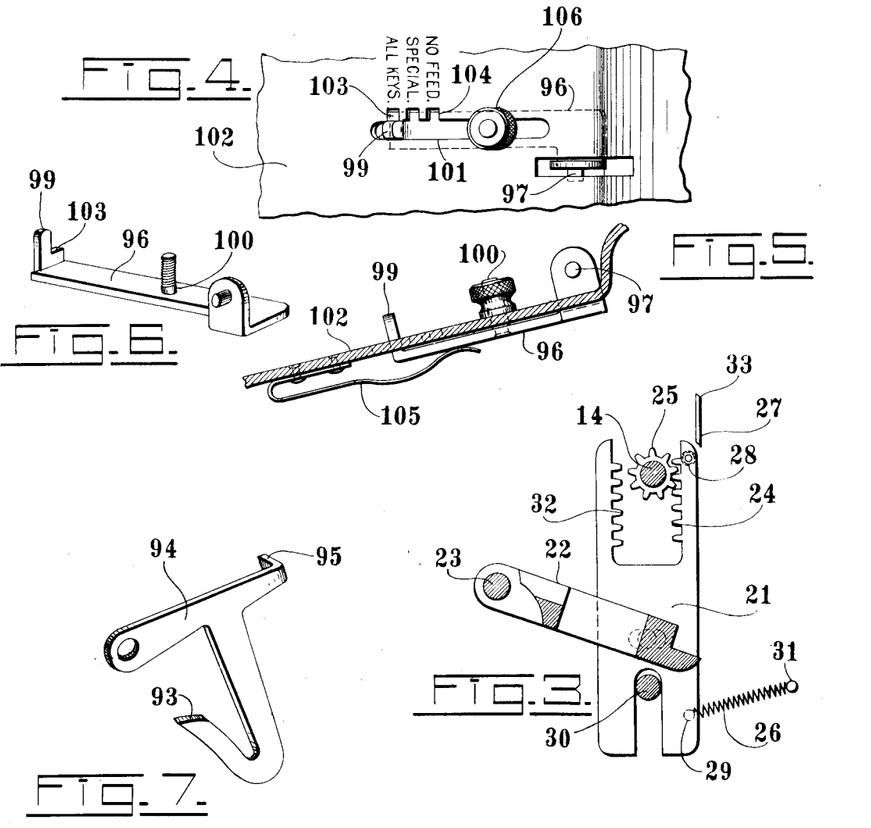
Fig. 3 is a detail of the means for rotating the cam shaft of the cash register.
Fig. 4 is a top plan of a device for adjusting the controlling mechanism for the autographic paper feeding mechanism.
Fig. 5 is a side elevation of the adjusting device shown in Fig. 4.
Fig. 6 is a perspective detail of the adjusting device shown in Fig. 4.
Fig. 7 is a perspective view of the retaining pawl for a toothed wheel, which is secured to the receiving roll for the detail paper.
Figure 8:
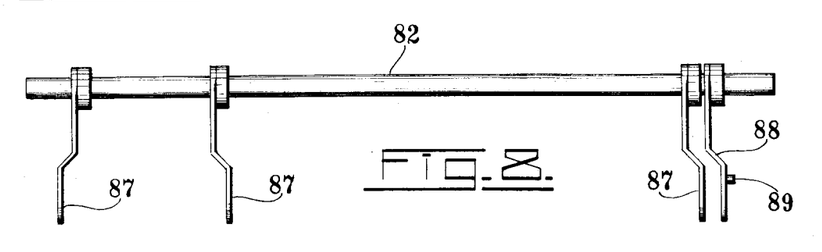
Fig. 8 is a top plan of a shaft which is oscillated by means of the special keys and the arms carried by said shaft which the special keys act upon to oscillate the shaft.

Referring to the drawings of the first form, Figs. 1 to 8, the amount keys are indicated at 1, Figs. 1 and 2, and are loosely pivoted on the rod 2. At their rear ends they support indicator tablet rods 3 which rods carry tablets 4 bearing numerals which indicate the value of the keys. Each amount key also has pivoted to its rear end an upright 5 slotted at 6 where it engages a rod 7 when the particular key to which it is secured is depressed. The rod 7 is carried by the segment gear 8 loosely mounted upon the shaft 9. The amount keys are all grouped according to denominational order and each group of keys, through its set of uprights 5, actuates a segment gear 8, there being one segment gear for each group of keys. Each of the segment gears 8 actuates a pinion 10 of the totalizer which carries a numbered drum 11 bearing the same numbers as the keys of the group which effects its rotation with the addition of a cipher. Said segment gears 8 also actuate pinions 110, Figs. 2 and 11, to set the three amount type wheels 112. The totalizer is rocked from its pivot 18$^a$ into and out of mesh with the segments 8 at the proper times by means of the cams 12 and 13, which are carried by the shaft 14 and act upon rollers 15 and 16, one of which is carried by a lever 19, which is pivoted at 17 to the totalizer frame 18 and the other is carried by the totalizer frame. The lever 19 extends forwardly where it engages a spring pressed plunger 20 of the totalizer frame when rocked by the cam 12, and thereby rocks the totalizer frame to carry the totalizer into mesh with the segment 8. The shaft 14 which carries the cams 12 and 13 is rotated by the double rack 21 (Fig. 3), which is carried by the key coupler 22. The key coupler is pivoted at 23 and extends across all of the rear ends of the keys so that when any key is depressed, the key coupler will be rocked upwardly, thus carrying the rack 21 upwardly. The teeth 24 and 32 of the rack are held in mesh with the pinion 25 on the shaft 14 by the spring 26, and the guide 27, as is fully described in the Carney patent referred to.

The special keys control means for making the mechanism which meshes the totalizer with the segments 8 inoperative when any one of the special keys is depressed. The special keys are indicated at 35, (Figs. 1 and 2), and each carries a pin 36 which acts upon the edge 37 of a member 38 fixed to the shaft 39. This shaft also carries the arm 40, which, when the shaft 39 is rocked, through the depression of one of the special keys, moves into engagement with the beveled edge 41 of the spring pressed plunger 20 and forces the plunger inwardly in the frame 18 thus bringing the cut away part 42 of the plunger 20 opposite the arm 19. Then when the arm 19 is rocked by the cam 12, the arm 19 moves into the cut away part 42 of the plunger 20 without affecting the position of the totalizer. The plunger 20 is spring pressed to its outer position, so, when the arm 40 is rocked back to its normal position upon the rise of the special key, the plunger 20 springs to its normal position where it will be engaged by the arm 19. The special keys are provided with latches 44 and 48, as indicated in Fig. 2, which serve to hold the key partly depressed when the machine is operated by first depressing a special key and then the amount keys. The special keys, except the "No Sale" key, are so shaped at 49 that the key coupler cannot be rocked upwardly by a special key, but the special key may be depressed far enough to cause the shoulder 43 of the special key to be moved into the path of the key coupler so that when the key coupler is rocked upwardly by one of the amount keys, the special key will be also carried upwardly, thus fully depressing the front end of the special key. When the special key is partly depressed in order to bring it into engaging position with the key coupler, the pivoted pawl 44, which is carried by the special key, strikes the key coupler at 45 and is thereby rocked from its pivot 46. The pawl 44 is toothed at 47 where it coacts with the pawl 48 and when rocked by engagement with the key coupler, it causes the pawl 48 to be rocked in the direction indicated by the arrow 50; the pawl 48 then serves as a rest for the special key holding the rear end of the special key up so the key will be engaged by the key coupler upon the depression of one of the amount keys. The pawls 44 and 48 are returned to normal position by the end 45 of the key coupler engaging the pawl 44 when entering the notch 51 of the special key, when the special key and key coupler are rocked upwardly; the keys and key coupler having pivotal centers arranged to effect this action.

The "No Sale" key 35ᵃ operates the totalizer disconnecting mechanism in the same way as the other special keys, but is identical in form with the amount keys 1 at the point where it engages the key coupler. It is, therefore, possible to rock the key coupler by depressing the "No Sale" key alone, whereas the other special keys must be depressed in combination with the amount keys.

Figure 11:
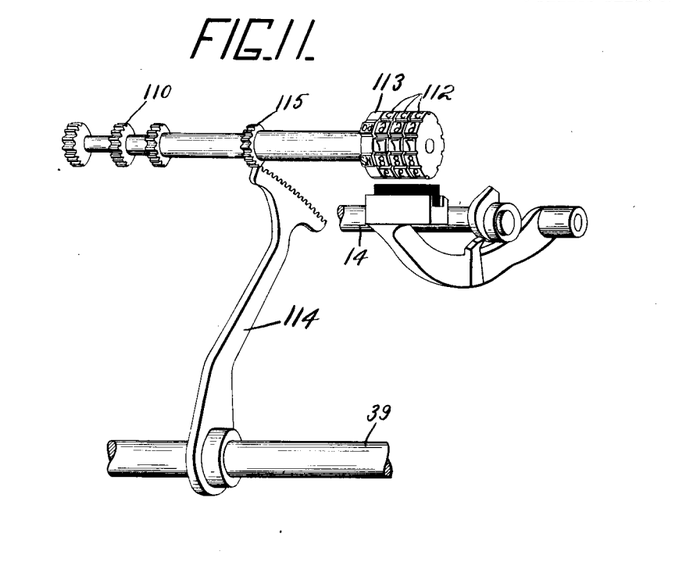
Fig. 11 is a detail in perspective showing the printing mechanism including type wheels and their connections to the differential mechanism.

As hereinbefore stated, the printing mechanism comprises a special type wheel to print characters indicating the various classes of transactions. This wheel which is shown at 113, Fig. 11, is set at its various printing positions by a segment 114, fastened to the special key operated shaft 39, and meshing with a pinion 115 attached to the tube carrying the special type wheel. In order to differentially operate the segment 114 the members 38 attached to the shaft 39 are so graduated that each of the four special keys when operated will impart a different extent of movement to the shaft and segment.

*Autographic register.*—The frame 52 of the autographic register is mounted on the lid 53 of the cash register, which is pivoted at 54 to the register cabinet. The platform 55 of the autographic frame serves as a hand rest when autographic records are made upon the strip of autographic paper 56, which, for this purpose, passes over the platform 57 below the opening 58 in the table 55. Inside of the casing 52 is a second frame 59 which supports the mechanism of the autographic register. The frame 59 is made of a single piece of sheet metal bent to form the two side frames of the autographic mechanism, and the platform 57 which connects the two sides of the frame. It is hinged to the lugs 60, which are carried by the platform 55 and the two sides of the frame are connected at their forward ends by the tie bar 61, which serves to make the platform more rigid. One of the sides of the frame 59 is notched at 62 through which notch a pin 63 passes. The pin 63 is carried by the spring pressed arm 64 which is pivoted to the lug 65, this pin 63 serving to support the forward end of the frame 59. The register lid 53 may be rocked upwardly from its hinge 54, carrying with it the autographic mechanism, and then the arm 64 may be rocked forwardly to carry the pin 63 out of engagement with the notch 62, and thereby permit the frame 59 to be rocked downwardly from its pivot 67. The autographic device is constructed in this way for the purpose of facilitating the replacing of the strip of autographic paper. The frame 59 carries a pair of adjustable legs 66 which rest upon the casing 70 of the cash register to support the frame 59 when it is in its lower position. The two sides of the frame 59 are notched at 68 to receive the ends of the shaft 69 of the supply roll 70 which carries the autographic paper. From the roll 70 the strip is led over the platform 57, over the roll 71 which is carried by the shaft 67, and from there to the roll 72 which is the receiving roll for the autographic paper. The roll 72 is journaled in the two sides of the frame 59, and its shaft 73 carries a star wheel 74 which is actuated by a pawl 75 for the purpose of feeding the strip of autographic paper. The pawl 75 is carried by the lever arm 76, which is pivoted to the side frame of the cash register at 77, and which may be rocked around its pivot 77 to rotate the star wheel 74, and thereby the roll 72. The lever 76 is rocked by the member 78 which is pivoted to the arm 76 at 79, and may be reciprocated in a vertical direction either by the cut away nose of a disk 80 on the shaft 14, or the lever 81, which is loosely journaled on the shaft 14, and is actuated from the shaft 82, which, for this purpose, is oscillated upon the depression of any one of the special keys. The lever 76 is normally held in its upper position by the spring 86, which is coiled around the shaft 77 of the lever 76 and bears between a fixed pin in the side frame of the machine and the lever 76. The member 78 extends rearwardly at 83 below the pin 84 of the lever 81, and the high part 85 of the cam 80. It has been explained that the shaft 14 is rotated once upon each operation of the machine. Therefore, with the member 78 in the position which it is shown in Fig. 2, the depression of any key will cause the feed of the strip of autographic paper as when the shaft 14 rotates in the direction indicated by the arrow 34, the cut away disk 80 will draw the member 78 downwardly far enough to cause the star 74 to be moved one tooth space. The member 78 may, however, be rocked from its pivot 79 to carry the extension 83 of the member 78 clear of the disk 80. In such case the rotation of the shaft 14 will not cause the feed of the strip of autographic paper. The member 78 can be moved to three positions; one position as indicated in Fig. 2; another position in which the part 83 of the member 78 is clear of the disk 80, but still in the path of the pin 84 of the lever 81, or it may be moved to another position in which it is clear of both the disk 80 and the pin 84. The depression of any one of the special keys will cause the shaft 82 to be oscillated as the shaft carries arms 87 which extend into the paths of the special keys. The shaft 82 carries a similar arm 88 which is pivotally connected to the lever 81 by the pin 89. (See Figs. 2 and 8.) Each of the special keys carries an extension 90 at its rear end which, when the key is depressed, engages the surface 91 of one of the arms 87 or 88 and causes the arm to rock upwardly and then permits the arm to return upon the release of the special key. The rocking of the arm 87 causes the shaft 82 to oscillate and, as it is connected by the arm 88 to the lever 81, the lever 81 will be rocked from its pivot 14, and the pin 84, which is carried by the lever 81, will cause the member 78 to be drawn downwardly, and thereby effect the feed of the strip of autographic paper. The member 78 when rocked clear of both the disk 80 and the pin 84 is inoperative and in such position of the member 78, the autographic paper will not be fed upon an operation of the machine.

The pin 111 by which the pawl 75 is pivoted to the lever 76 terminates in a knob which extends through an elongated slot in the right side of the casing of the autographic device. By means of this knob, the paper feeding mechanism may be operated by hand independently of the setting of the member 78, and if it is desired to make an autographic notation regarding some transaction when the feed mechanism is disconnected from the drive of the register, the knob 111 is depressed, thus causing the lever 76 to rock downwardly and actuate the star wheel 74. The member 78 is rocked to any of its three positions by means of the slide 96 (see Figs. 2, 4, 5 and 6), which carries a pin 97 extending into a slot 98 of the member 78. It is guided in its longitudinal movement by the lug 99 and the threaded pin 100 which project into the slot 101 in the casing 102 of the cash register. The slide 96 may be slightly rocked from its pivot 97 to carry a part 103 of the lug 99 out of one of the notches 104 in the register casing at the side of the slot 101, and may then be moved in a longitudinal direction for the purpose of bringing the part 103 of the lug 99 into position to register with any desired one of the notches 104. The spring 105 will urge the slide 96 upwardly from its pivot 97 to carry the part 103 of the lug 99 into any of the notches 104. The threaded pin 100 carries a milled nut 106 for the purpose of clamping the slide 96 in any of its set positions. The lever 76 carries a pin 92 which, when the arm is rocked downwardly, engages the inclined surface 93 of the overthrow preventer pawl 94 (see Figs. 2 and 7), and causes the pawl to be rocked downwardly from its pivot 67. The pin 92 is so situated on the arm 76 that the pin will not engage the overthrow preventer pawl 94 until after the point of the star wheel 74 which is just above the point of the star wheel which is acted upon by the pawl 75 passes the flange 95 of the overthrow preventer pawl 94. The downward rocking of the overthrow preventer pawl 94 brings the bent flange 95 in the path of one of the arms of the star wheel 74 at such position as to prevent the star wheel from moving more than one-sixth of a rotation, but allowing it to move the full one-sixth of a rotation.

A spring pressed retaining pawl 107 engages the points of the star wheel 74 for the purpose of compelling the star wheel to rotate an equal amount upon each operation of the feeding mechanism. The spring 108 bearing against the roll of supply paper acts as a brake to prevent the roll 70 from rotating ahead of the roll 72.

*Operation.*—The operation of the machine is as follows: The slide 96 may be adjusted to rock the member 78 to any one of its three positions after raising the lid 53 which will carry all of the autographic mechanism clear of the milled nut 100 by which the slide 96 is adjusted. If the member 78 is left in the position as indicated in Fig. 2, then the depression of either an amount key or one of the special keys will cause the member 78 to be reciprocated in a vertical direction and, therefore, effect the feed of the autographic paper. If an amount key is depressed, the key coupler 22 will be rocked upwardly and returned, thereby causing the rotation of the shaft 14. This shaft carries the disk 80 having a cut away nose which, when the shaft 14 is rotated and the member 78 is in the position indicated in Fig. 2, will carry the member 78 downwardly, thus causing the strip of autographic paper to be fed one writing space as the member 78 is pivoted to the lever 76 which carries the pawl 75 for actuating the star wheel 74 upon which is mounted the receiving roll 72. After the nose of disk 80 passes clear of the point 83 of the member 78, the member 78 is returned to its upper position by the spring 86. Upon the rise of the member 78, the pawl 75 idly wipes by the arm of the star wheel 74, which is in its path. If one of the special keys is depressed when the arm 78 is in the position in which it is indicated in Fig. 2, the autographic paper will be fed in the same manner as the key coupler is forced upwardly upon every operation of the machine. The special keys with the exception of the "No Sale" key are always depressed in combination with amount keys, although, when a special key is depressed in connection with the amount keys, the amount represented by such keys will not be added to the totalizer, but said amount and characters designating the special key used will be printed upon the detail strip 109 of the cash register. If the slide 96 is moved to carry the shoulder 103 of the lug 99 into the notch opposite to which is the word "Special," (see Fig. 4), the arm 78 will be rocked to carry the extension 83 clear of the disk 80, but allowing it to still be in the path of the pin 84 which is carried by the lever 81. With the member 78 in this position, the autographic paper feed mechanism will not be operated when amount keys only are depressed as the disk 80 will not then engage the extension 83. However, if any one of the special keys is depressed, the extension 90 of the key will engage one of the arms 87 or 88 of the shaft 82 and will cause the shaft to oscillate thereby rocking the lever 81 through the arm 88 and pin 89 and causing the lever to engage the extension 83 of the member 78 and thereby carry the member 78 downwardly and effect the feed of the strip of autographic paper. If the slide 96 is moved to bring the shoulder 103 into the notch opposite the words "No Feed," (see Fig. 4), then the member 78 will be rocked clear of both the disk 80 and the pin 84 of the lever 81, and, upon an operation of the machine, no feed of the autographic strip will take place regardless of what keys are depressed.

The means for causing the strip of autographic paper to feed upon all operations or only upon special operations as desired is valuable, in that by this adjustment the autographic attachment can be made to meet the requirements of various kinds of business. For instance, it may be desired to make autographic notations upon special transactions only, such as "Charge," "Paid Out" or "Received on Account." In this case it would not be desirable to have the autographic strip feed upon every operation of the machine and thereby be wasted. In other cases it may be desirable to make autographic notations regarding every transaction which is recorded in the cash register, and, of course, at times the autographic device may not be needed at all. The improvement brought about by the present invention meets all of these requirements.

Figure 9:
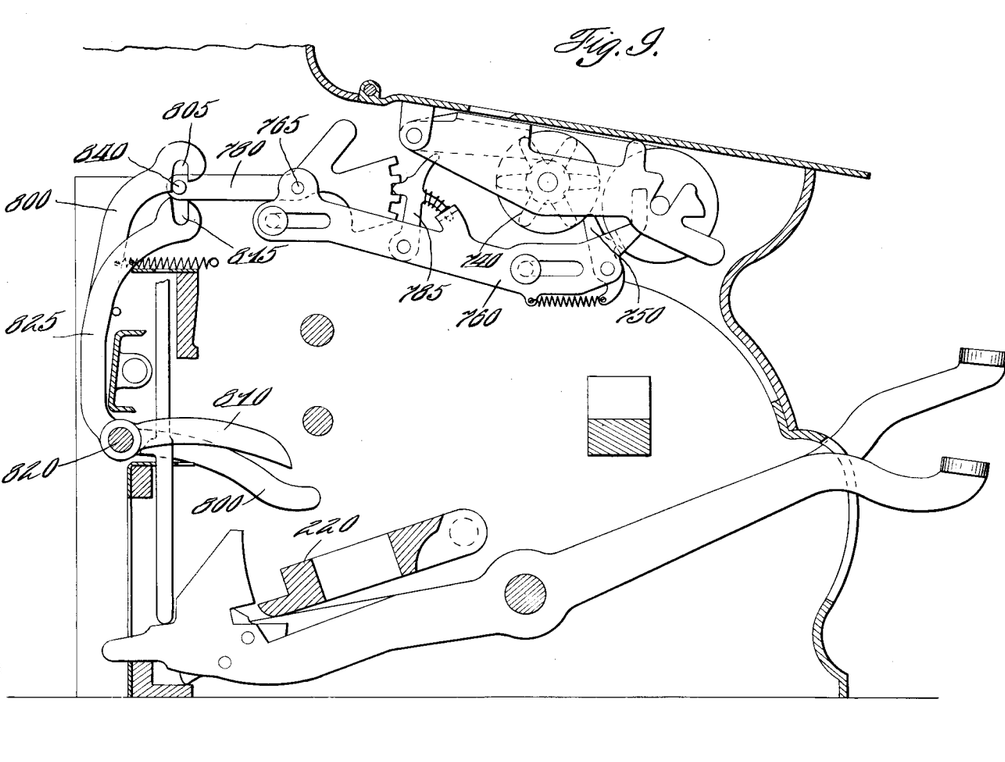
Fig. 9 is a modification.
Figure 10:
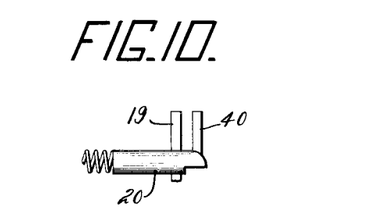
Fig. 10 is a detail of part of the mechanism by which the totalizer is rocked into mesh with its actuating segment gears.

Turning now to Fig. 9, the changes in this modified form will be readily understood, as the general operation is the same as the previous form. The feeding star for the autographic device is actuated by movement of a pawl carrying means, in this form a slide, and pivoted to this slide is a connecting piece, manually movable into any one of three positions. The amount keys actuate a coupler as in the first form, and this coupler drives a pivoted arm having a notch adapted to be engaged by the connecting pin in one of its three positions. The special keys actuate a pivoted arm, also having a notch, and positioned to engage the connecting pin when the pin is in another of its three positions. In the third position of the connecting pins, it is not engaged by either of the notches and the autographic device in consequence remains inoperative.

The autographic device itself is substantially similar to that shown in the first form and needs no additional description. The driving star wheel 740 is engaged and operated by a pawl 750 carried by a slide 760. Pivoted to this slide 760 by pin 765 is a connecting arm 780 bearing a connecting pin 840 and adapted to be manually moved to any one of three positions, to be held in these positions by a latching pawl 785.

The amount keys actuate a key coupler 220 directly over and in the path of which is a pivoted lever arm 800, having a notch 805 at its upper end. A spring, as shown, returns this lever arm to its normal position on the return of the coupler. The lever arm 800 is loose on shaft 820 and tight on this shaft are a plurality of depending arms 810, one for and positioned to be engaged by each special key. Also fast on shaft 820 is an upwardly extending lever arm 825 having a notch 815 positioned to engage the connecting pin 840. It will be clear that when any amount key is actuated the lever 800 will be rocked and when any special key is actuated, the lever arm 825 will also be rocked. The position of connecting arm 780 and pin 840 determines whether the actuation of these lever arms shall actuate the slide 760 and the autographic device. In the position of Fig. 9, the pin 840 does not engage either of the notched lever arms and the autographic device is inoperative. If the connecting arm 780 is moved to carry its pin 840 into the notch of arm 800, the autographic device will be operated on actuation of any amount key, and, in fact, also when any special key is operated as these special keys also operate the coupler. If the connecting arm 780 is moved to carry its pin 840 into the notch of arm 810, the autographic device will be actuated only if a special key is depressed.

It will be seen that the mode of operation is the same in both forms. In each an autographic device connecting element may be manually moved into three positions. In one position the connecting element will be actuated by a device driven from the coupler and, therefore, operable by the amount keys. In a second position, the connecting element is actuated by a lever driven by the special keys, while in the third position, both amount and special keys are inoperative with respect to the autographic device.

While the form of mechanism herein shown and described is admirably adapted to fulfill the objects primarily stated, it is to be understood that it is not intended to confine the invention to the one form of embodiment herein disclosed for it is susceptible of embodiment in various forms all coming within the scope of the claims which follow.

What is claimed is:

1. In an accounting machine, the combination with recording mechanism and means for differentially positioning the same, amount keys and special keys for controlling said means, means for feeding an autographic paper strip upon an operation of the machine, and a device for so controlling said feeding means that the same will be operative when the amount keys alone are depressed or be operative only when one of the special keys is depressed or be entirely inoperative.

2. In an accounting machine, the combination with recording mechanism and means for differentially positioning the same, amount keys and special keys for controlling said means, means for feeding an autographic paper strip upon an operation of the machine, and a device for so controlling said feeding means that the same will be inoperative only when amount keys alone are depressed.

3. In an accounting machine, the combination with recording mechanism and means for differentially postioning the same, of amount keys and special keys for so controlling said means, means for feeding an autographic paper strip upon an operation of the machine, and a device for controlling said feeding means that the same will be operative only when any one of the special keys is depressed.

4. In an accounting machine, the combination with recording mechanism and means for differentially positioning the same, amount keys and special keys for controlling said means, means for feeding an autographic paper strip upon an operation of the machine and a device for controlling said means to cause the same to be entirely inoperative.

5. In an accounting machine, the combination with registering mechanism and means for differentially operating the same, means for feeding an autographic paper strip upon each operation of the machine, said means comprising a roll and a toothed wheel which is secured to the roll, a pawl for causing rotation of said toothed wheel, means for actuating said pawl and an overthrow preventer for said wheel, said overthrow preventer being actuated by the means for actuating the pawl.

6. In an accounting machine, the combination with recording mechanism and means for differentially positioning the same, amount keys and special keys for controlling said means, means for feeding an autographic paper strip upon operations of the machine, a device for so controlling said feeding means that the same will feed the paper only when a special key is depressed and separate means for causing the feed of the autographic paper at will.

7. In an accounting machine, the combination with registering mechanism and means for differentially operating the same, means for feeding an autographic paper strip upon each operation of the machine, said means comprising a roll and a toothed wheel which is secured to the roll, a pawl for causing rotation of said toothed wheel, means for actuating said pawl, an overthrow preventer for said wheel, said overthrow preventer being actuated by the means for actuating the pawl, and a retaining pawl for said wheel which serves to aline said wheel for the purpose of urging the wheel to rotate like amounts upon each operation of the wheel.

8. In an accounting machine having a casing, the combination with registering mechanism, of means for differentially operating the same, a support for an autographic strip, a casing for the support, said casing being hinged to the machine casing, and the support for the autographic paper being hinged at one end to its own casing.

9. In an accounting machine, the combination with registering mechanism, of means for differentially operating the same, a support for a roll of autographic paper, a casing for the roll of autographic paper, said casing being hinged to the accounting machine, and the support for the roll of autographic paper being hinged to its own casing.

10. In a machine of the class described, the combination with means for carrying an autographic strip, of a device including a lever and a hook depending from said lever for rotating said strip carrier, a hand operable key, an element having a cut away nose actuated thereby and positioned to engage said depending hook, and a slide for withdrawing said hook from coöperation with said nose.

11. In a machine of the class described, the combination with means for carrying an autographic strip, of a device including a lever and a driving element pivoted to said lever for rotating said carrier, an element having a cut away portion positioned to actuate said driving element, a key and connections for operating said cut away element, and hand operated means for rocking said driving element from coöperation with said cut away element.

12. In a machine of the class described, the combination with a means for carrying an autographic strip, of a device including a lever and a hook depending from said lever for rotating said carrier, keys for indicating transactions having differing characteristics, a disk having a cut away portion for actuating said hook, connections whereby one of said keys actuates said disk, a lever bearing a pin for also actuating said hook, with connections from said lever to a second one of said keys, and a manually differentially movable slide connected to said hook, and capable of movement to withdraw said hook from coöperation with said disk while having it in coöperation with said pin.

13. In an accounting machine, the combination with a recording mechanism, of amount keys, special keys, an autographic device and a mechanism adjustable at will to cause the autographic to be operated, either by special keys or by both amount and special keys, or remain inactive on operation of either set of keys.

14. In an accounting machine, the combination with a registering mechanism, of means for actuating said registering mechanism, a recording device including a special printing device for recording classes of transactions, special keys and connections therefrom, for positioning said special printing devices, an autographic device having a record strip and means actuated by said special key for feeding the autographic strip, and comprising a lever reciprocated by the special key and a link connecting said lever to the autographic device.

15. In an accounting machine, the combination with a recording mechanism and means differentially positioning the same, amount keys and special keys for controlling said means, means for feeding an autographic paper strip upon an operation of the machine, and a device for so controlling said feeding means that the same will be operative when the amount keys alone are depressed or be operative only when one of the special keys is depressed.

16. In an accounting machine, the combination with a recording mechanism and means differentially positioning the same, amount keys and special keys for controlling said means, means for feeding an autographic paper strip upon an operation of the machine, and a device for so controlling said feeding means that the same will be operative when the amount keys alone are depressed or be operative only when one of the special keys is depressed and separate manually operable means for actuating the feeding device.

17. In an accounting machine, the combination with a recording mechanism, of amount keys, special keys, an autographic device and a mechanism adjustable at will to cause the autographic device to be operated, either by special keys or by both amount and special keys.

18. In a machine of the class described, the combination with a totalizer, of a printing device comprising a record strip, value keys for entering amounts in the totalizer and on the record strip, special keys operable only with value keys and disabling the totalizer, an autographic device having a movable paper strip, feeding devices therefor, and adjustable devices whereby, when desired, entering an item on the record strip but not in the totalizer will operate said feeding devices.

19. In a machine of the class described, the combination with a totalizer, of an indicating mechanism, an autographic strip having a movable paper strip and feeding devices therefor, devices for operating the totalizer and indicating mechanism, means whereby an item may be indicated but not entered on the totalizer, and adjustable devices whereby when desired, indicating an item but not entering it on the totalizer will operate said feeding devices.

In testimony whereof I affix my signature in the presence of two witnesses.

JOHN A. WERNER.

Witnesses:
FRED E. HAMILTON,
R. RUMMLER.